US005731099A

United States Patent [19]
Badger et al.

[11] Patent Number: 5,731,099
[45] Date of Patent: Mar. 24, 1998

[54] APPARATUS FOR CHARGING A CONTROLLED VOLUME OF AN ELECTROLYTE TO BATTERY CASE

[75] Inventors: John P. Badger; Joseph P. Badger, both of Genoa; Jarrett L. Fuller, Fremont, all of Ohio

[73] Assignee: JBI Corporation, Genoa, Ohio

[21] Appl. No.: 721,825

[22] Filed: Sep. 27, 1996

[51] Int. Cl.⁶ .................................................. H01M 2/36
[52] U.S. Cl. .................... 429/72; 429/80; 141/59; 137/260
[58] Field of Search ..................... 429/71, 72, 80; 141/7, 59, 234, 237, 285, 301, 302; 29/730; 137/260

[56] References Cited

U.S. PATENT DOCUMENTS

| | | | |
|---|---|---|---|
| 3,249,132 | 5/1966 | Eberle | 141/59 |
| 3,372,716 | 3/1968 | Hommel et al. | 141/59 |
| 3,483,042 | 12/1969 | Hulse | 429/80 X |
| 3,534,785 | 10/1970 | Bensen | 141/41 |
| 3,561,505 | 2/1971 | Ryder | 141/237 |
| 3,630,788 | 12/1971 | Hennen | 136/177 |
| 3,911,972 | 10/1975 | Hubers et al. | 141/7 |
| 4,908,282 | 3/1990 | Badger | 429/59 |
| 5,012,175 | 4/1991 | Karna et al. | 320/2 |
| 5,150,745 | 9/1992 | Ford et al. | 429/72 X |

*Primary Examiner*—Anthony Skapars
*Attorney, Agent, or Firm*—David C. Purdue; John C. Purdue

[57] ABSTRACT

Apparatus operable to charge a controlled volume of an electrolyte through a filling opening into a battery case is disclosed. The apparatus comprises an electrolyte charging station, a manifold head having a vacuum outlet and a vacuum passageway connected to the vacuum outlet, an electrolyte reservoir and an electrolyte passageway connected to the reservoir, a manifold positioner operable to move the manifold head to and to support the head in a first position, in a second battery case evacuating position, and in a third battery case filling position, and a valve having a fluid discharge which is surrounded by a tube and is in fluid communication with the filling opening of a battery in the charging station when the manifold is in the second position and when the manifold is in the third position, and is spaced from the battery in the charging station when the manifold is in the first position. The tube is operable to engage the case of a battery in the charging station, around the filling opening therein, and in sealing engagement therewith, when the manifold in the second and third positions, and the valve is operable:

when the manifold is in the first position, to prevent the flow of fluid from the vacuum outlet and from the electrolyte reservoir to the fluid discharge of the valve, when the manifold is in the second position, to enable the flow of fluid through the vacuum passageway between the fluid discharge of the valve and the vacuum outlet, and to prevent the flow of fluid between the electrolyte reservoir and the fluid discharge of the valve, and when the manifold is in the third position, to prevent the flow of fluid through the vacuum passageway between the fluid discharge of the valve and the vacuum outlet and to enable the flow of fluid between the electrolyte reservoir, through the electrolyte passageway and the fluid discharge of the valve.

7 Claims, 6 Drawing Sheets

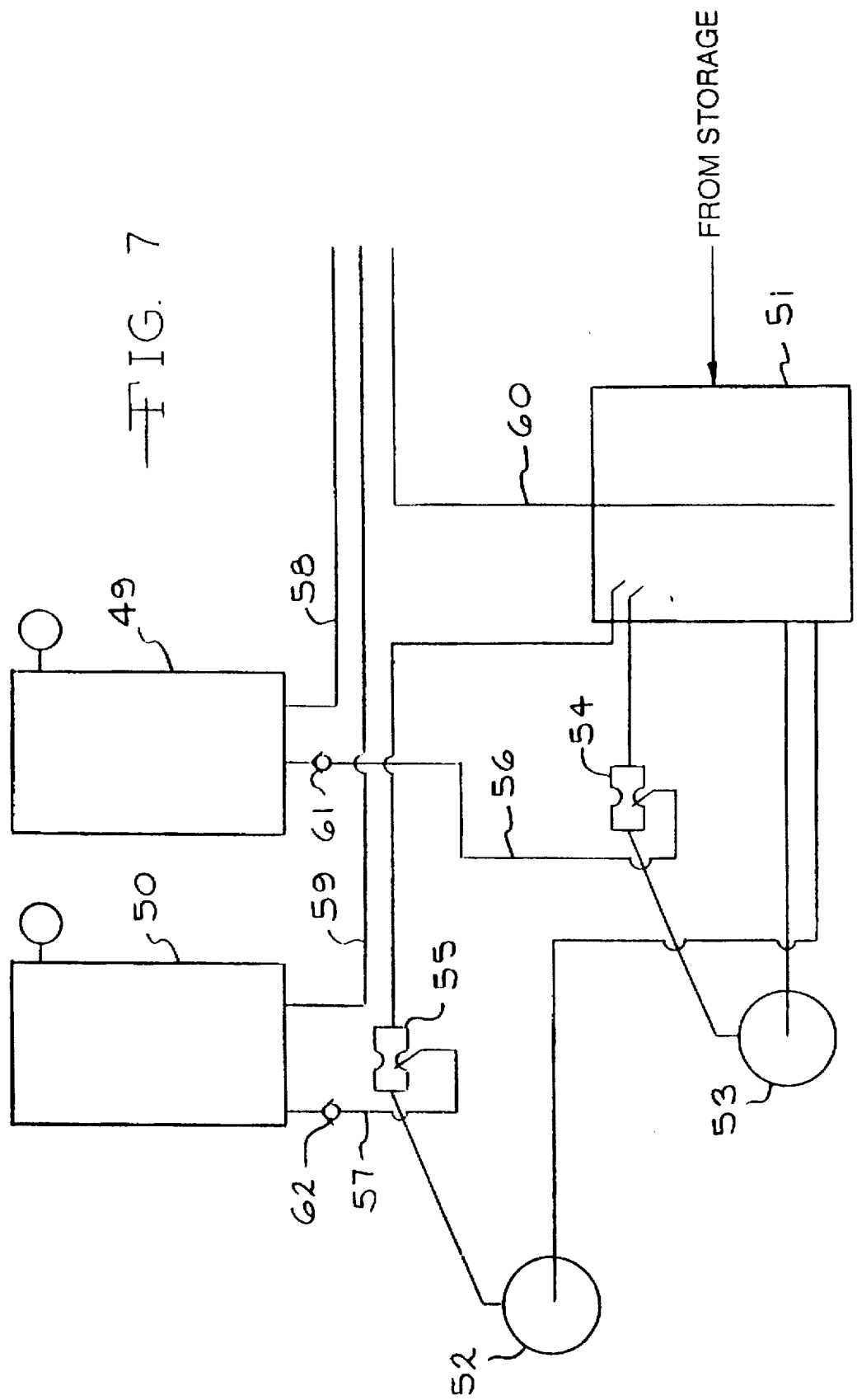

APPARATUS FOR CHARGING A CONTROLLED VOLUME OF AN ELECTROLYTE TO BATTERY CASE

FIELD OF THE INVENTION

This invention relates to apparatus for automatically charging a controlled volume of an electrolyte to a battery case.

BACKGROUND OF THE INVENTION

Storage batteries comprising a plurality of positive and negative plates with a separator material between adjacent plates, and an electrolyte in a case have been known for many years, and have been produced by a process which includes assembling the plates, separators and suitable electrical connectors, placing the assembly in a case, closing the case, and charging a suitable electrolyte to the case. In early batteries, electrolyte was sometimes charged by immersing the case, with the assembly inside, in a bath of the electrolyte material, and pouring a small amount of electrolyte from the case.

Recombinant batteries have been introduced recently. In such batteries, oxygen formed electrolytically at the positive plates inside a battery is able to migrate to the negative plates for electrolytic recombination; there must be gas-filled paths through which the oxygen can migrate. Therefore, the electrolyte can not completely fill the case, and a carefully metered amount of electrolyte must be charged, or a separator material which is capable of holding only an amount of electrolyte which leaves the required voids must be used (see, for example, U.S. Pat. No. 4,908,282, granted Mar. 13, 1990, "Badger").

THE PRIOR ART

Manually moved apparatus for evacuating and filling a battery is shown in U.S. Pat. No. 3,249,132, granted May 3, 1966, "Eberle". The apparatus has vacuum lines operably connected to a vacuum manifold and electrolyte lines operably connected to an electrolyte manifold. Atmospheric air enters the vacuum manifold of the apparatus through a normally open valve while the vacuum lines are placed in filling openings of a battery so that they extend slightly below the desired upper level of electrolyte in the battery. The atmospheric air prevents the build up of a substantial vacuum in the battery until the normally open valve is closed, manually, so that vacuum in the manifold keeps the valve closed, and air flows from the battery into the vacuum manifold until the pressure in the battery is sufficiently low that electrolyte flows from the electrolyte manifold through the electrolyte lines, which surround the vacuum lines, and into the battery. The flow of electrolyte into the battery continues until its level reaches the bottoms of the vacuum lines, and prevents the withdrawal of additional air from the battery. The flow of electrolyte into the vacuum manifold, the patent says, "acts to reduce the vacuum pull" enough that the normally open valve returns to its open position.

U.S. Pat. No. 3,372,716, granted Sep. 15, 1965, "Hommel et al.", discloses apparatus for filling a battery by transferring electrolyte from a container to the battery. A stream of compressed air flowing through a venturi draws a vacuum in a tube which extends under the surface of the electrolyte in the container and from a flexible conduit which is in fluid communication with the tube and with the battery to be charged with electrolyte. As a consequence of the vacuum, electrolyte from the container is forced to flow upwardly in the tube until it actuates a check valve, which then prevents further flow to the venturi from the tube and from the flexible conduit; as a consequence of previously established vacuum in the flexible conduit and in the battery, electrolyte is forced to flow through the flexible conduit to fill the battery.

U.S. Pat. No. 3,630,788, granted Dec. 28, 1971, "Hennen", discloses "a combined explosion proof vent, filling funnel, and automatic electrolyte leveling means * * *." The "automatic leveling means" is a funnel which is movable between an upper position in which the funnel is releasably supported, and the bottom of the funnel extends a given distance into a battery casing and a lower position. When the funnel is in the upper position, an operator can fill the battery with water or with an electrolyte until the water or electrolyte reaches the level of a visual indicator inside the funnel. When the funnel is then moved to the lower position, the electrolyte assumes the proper level in the battery. During filling, water or electrolyte flows from the funnel into the battery until the electrolyte level is sufficiently high to close the bottom of the funnel; an air pocket in the battery above the electrolyte then resists further flow from the funnel into the battery, and the level in the funnel rises to the level of the visual indicator.

U.S. Pat. No. 3,911,972, granted Oct. 14, 1975, "H übers", discloses apparatus for evacuating a container and then introducing a metered charge of a liquid into the container, which, first, is moved upwardly into a vacuum chamber, and, then, is filled with electrolyte which is forced by the movement of a piston in a cylinder into the container. The amount of electrolyte charged is determined by the distance the piston travels.

U.S. Pat. No. 3,534,785, granted Oct. 20, 1970 to Benson discloses apparatus for charging electrolyte to a battery. The apparatus includes a bellows which is operable, when a nozzle is sealed to a filling opening of the battery, to withdraw air from a cell of the battery to which the electrolyte is to be charged; thereupon, electrolyte in a container which is under atmospheric pressure is forced through a tube which extends to a predetermined height in the battery until the electrolyte in the battery reaches the predetermined height.

U.S. Pat. No. 3,561,505, granted Feb. 9, 1971 to "Ryder" discloses visual indicators which tell a viewer whether or not a battery to which they are attached requires water, and U.S. Pat. No. 5,012,175, granted Apr. 30, 1991 to "Kärnä et al.", discloses apparatus in which what is called a "forming plate" is fixed to several batteries; an acid-filling hose is coupled to the forming plate; and battery acid is supplied to each of the batteries fixed to the forming plate.

BRIEF DESCRIPTION OF THE INSTANT INVENTION

The present invention is apparatus operable to charge a controlled volume of an electrolyte through a filling opening into a battery case. The apparatus comprises an electrolyte charging station, a manifold head having a vacuum outlet and a vacuum passageway connected to the vacuum outlet, an electrolyte reservoir and an electrolyte passageway connected to the reservoir, a manifold positioner operable to move the manifold head to and to support the head in a first rest position, in a second battery case evacuating position, and in a third battery case filling position, and a valve having a fluid discharge which is surrounded by a tube and is in fluid communication with the filling opening of a battery in the charging station when the manifold is in the second position and when the manifold is in the third position, and is spaced from the battery in the charging station when the manifold is in the first position. The tube is operable to engage the case of a battery in the charging station, around the filling opening therein, and in sealing engagement therewith, when the manifold is in the second and third positions, and the valve is operable:

when the manifold is in the first position, to prevent the flow of fluid from the vacuum outlet and from the electrolyte reservoir to the fluid discharge of the valve, when the manifold is in the second position, to enable the flow of fluid through the vacuum passageway between the vacuum outlet and the fluid discharge of the valve, and to prevent the flow of fluid between the electrolyte reservoir and the fluid discharge of the valve, and when the manifold is in the third position, to prevent the flow of fluid between the vacuum outlet and the fluid discharge of the valve and to enable the flow of fluid through the electrolyte passageway between the electrolyte reservoir and the fluid discharge of the valve.

BRIEF DESCRIPTION OF THE DRAWINGS

FIG. 6 is the same as FIG. 3, except that it shows a reservoir that is partially filled with electrolyte.

FIG. 7 is a schematic diagram showing the circuits in which electrolyte is circulated in the apparatus of FIGS. 1 and 2.

DESCRIPTION OF THE PREFERRED EMBODIMENTS

Figure 2:
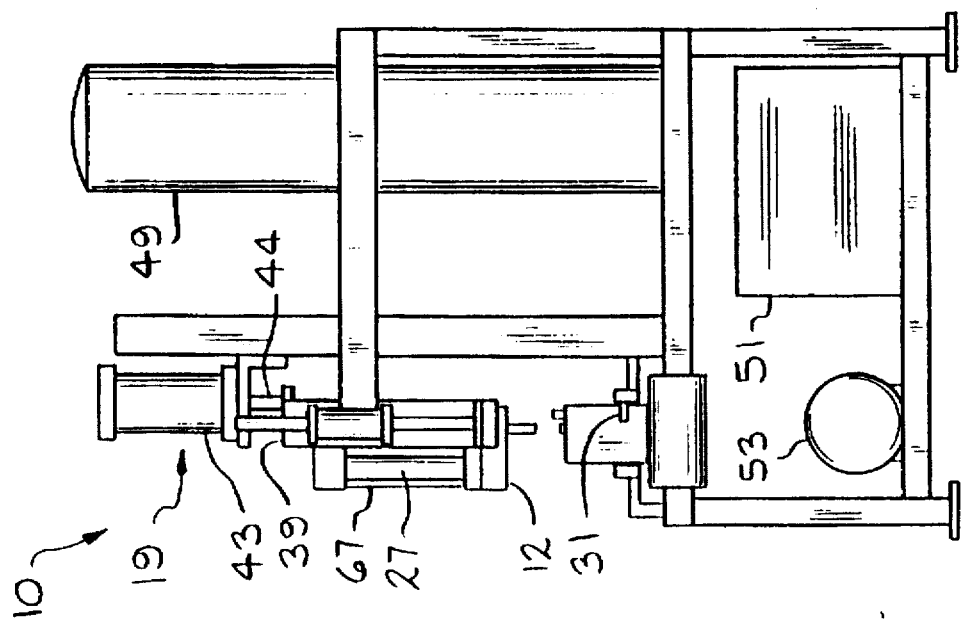
FIG. 2 is a schematic right side elevational view of the apparatus of FIG. 1.
Figure 1:
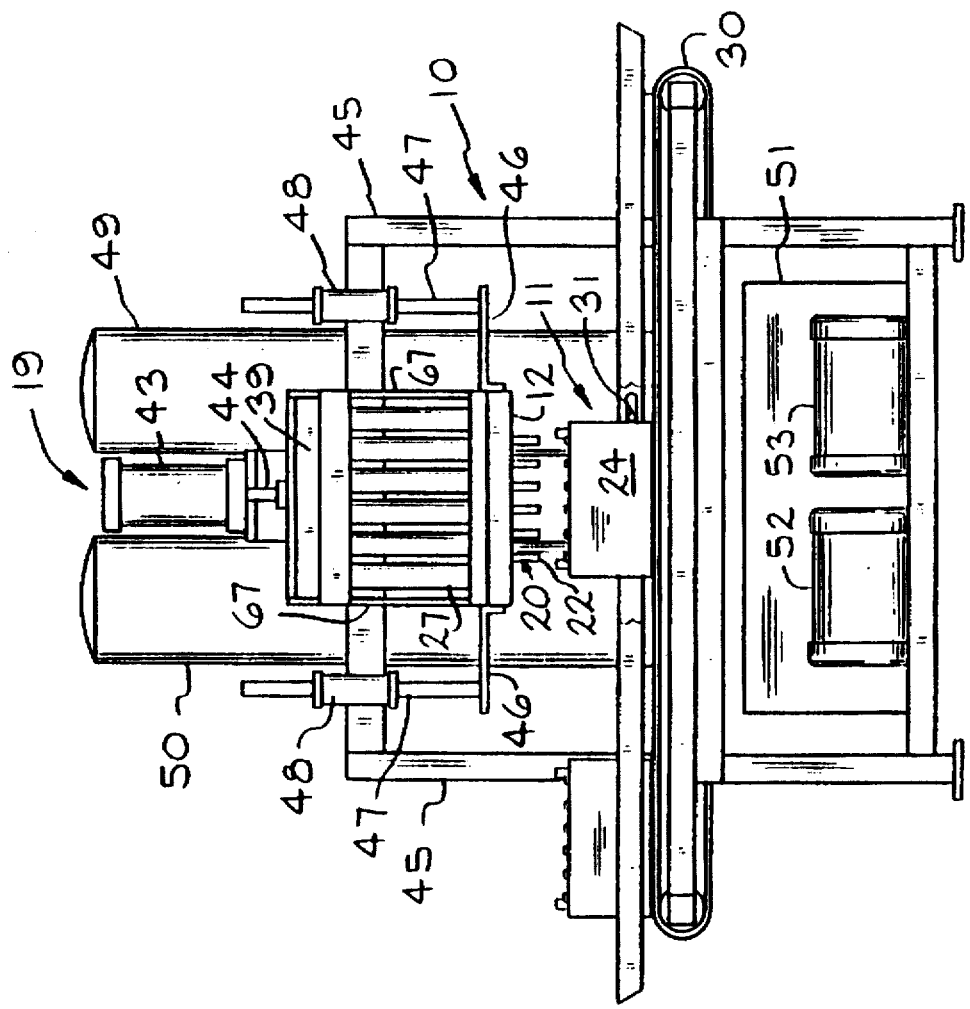
FIG. 1 is a schematic view in front elevation showing apparatus according to the invention for charging electrolyte to a battery.
Figure 3:
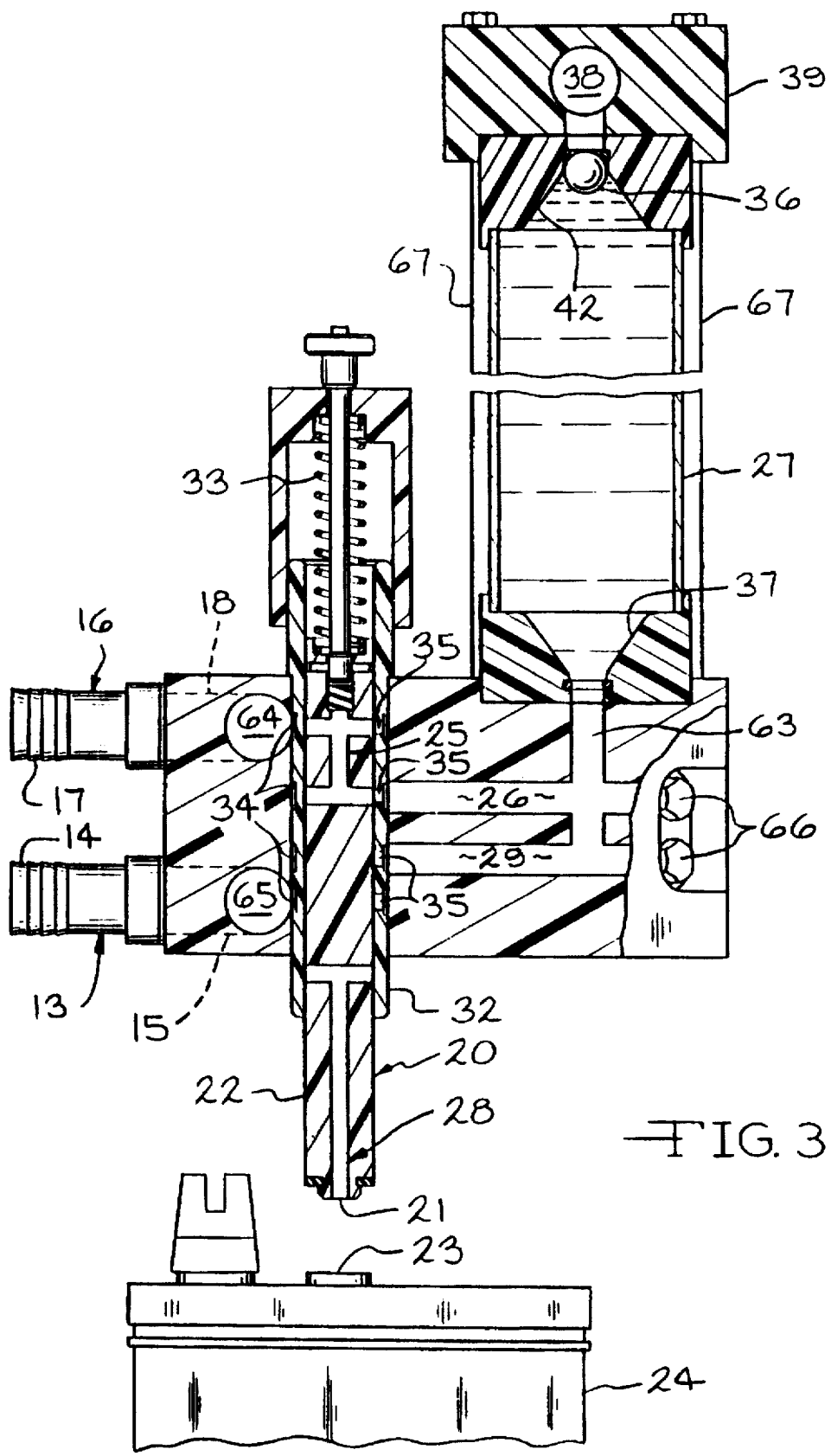
FIG. 3 is a left side elevational view of a portion of the apparatus of FIGS. 1 and 2, with a manifold in a first, electrolyte reservoir filling position, and with parts broken away to show details of construction.
Figure 4:
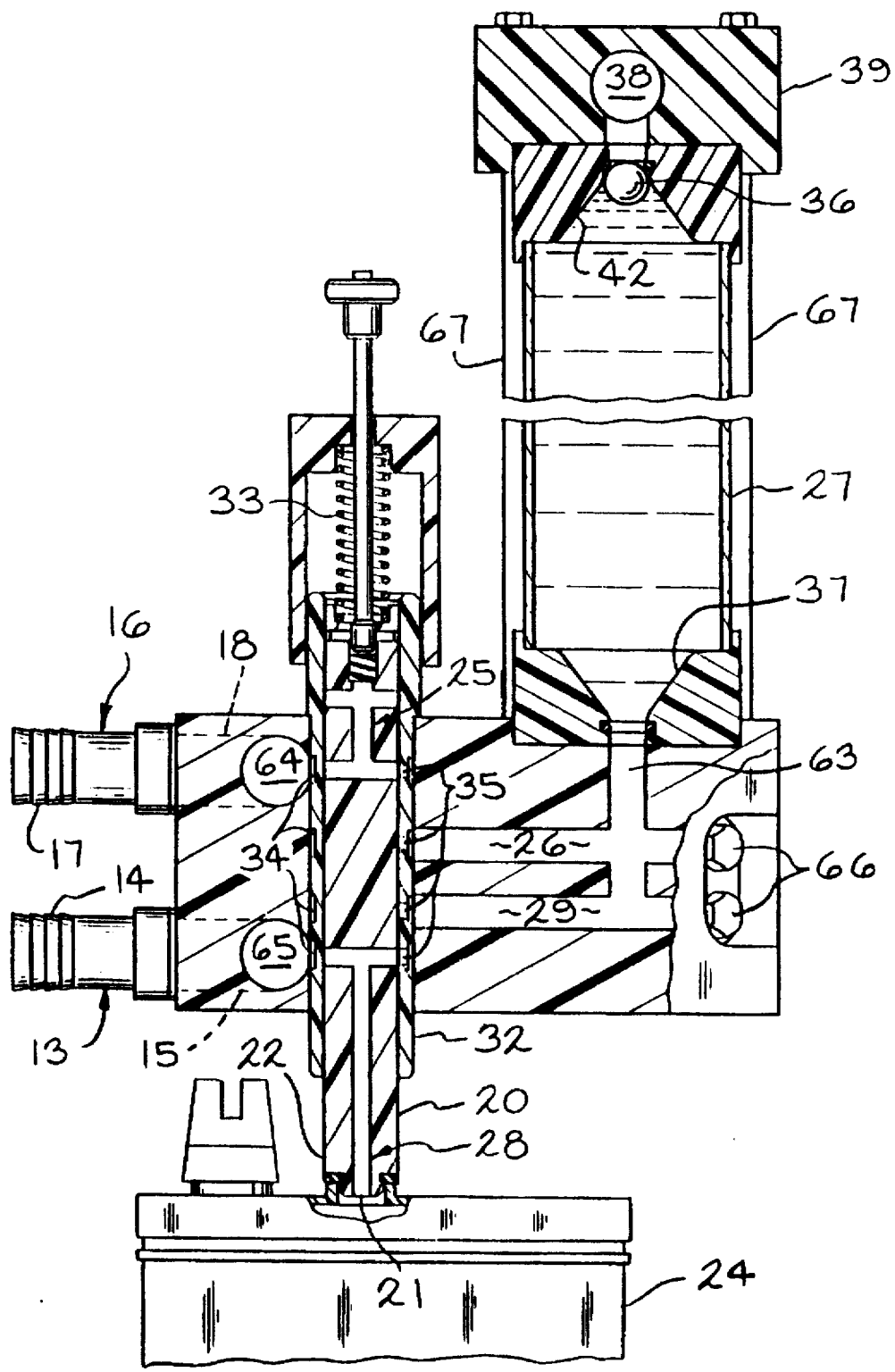
FIG. 4 is a left side elevational view of a portion of the apparatus of FIGS. 1 and 2, similar to FIG. 3, but showing the manifold in a second, battery case evacuating position.
Figure 5:
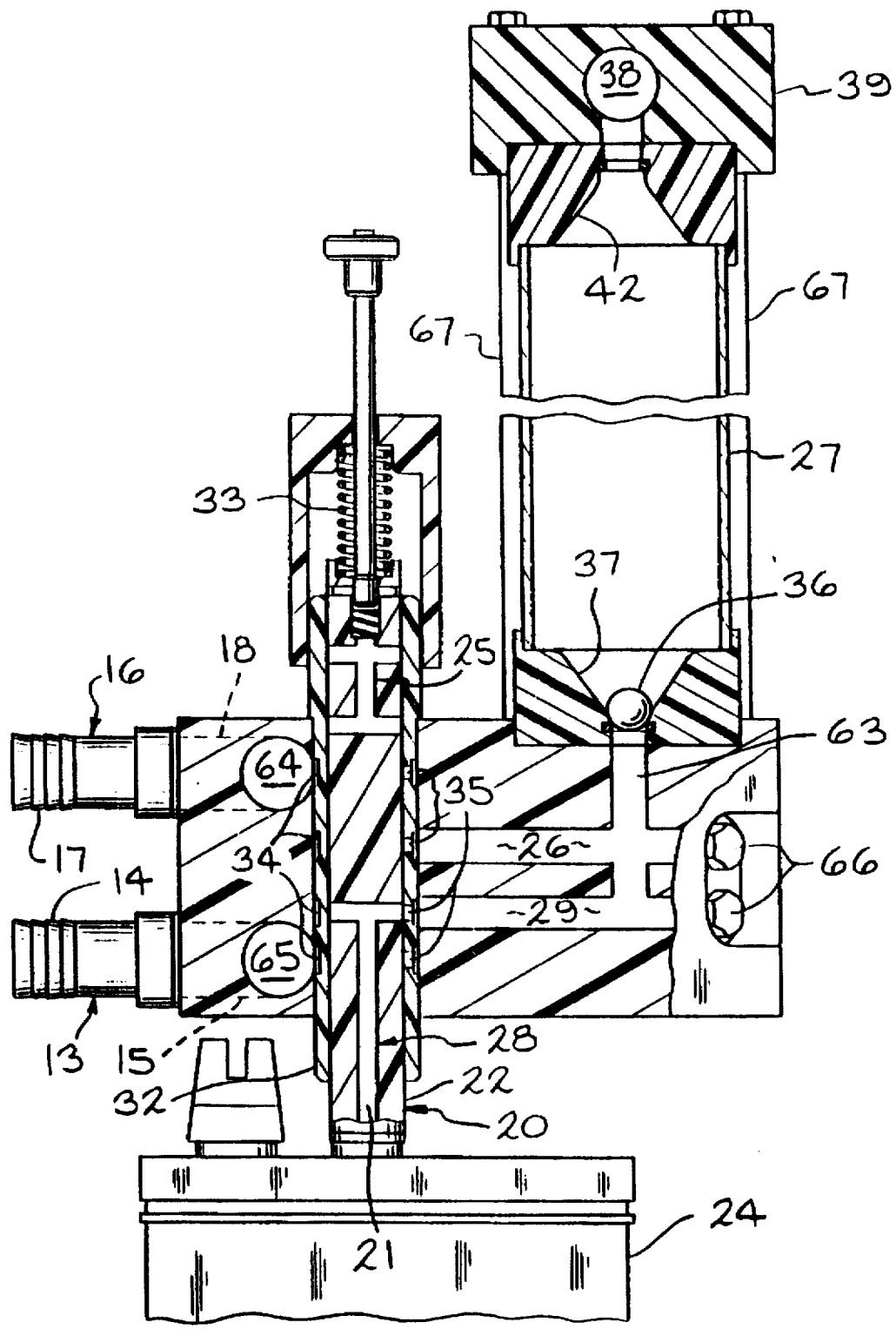
FIG. 5 is a left side elevational view of the apparatus of FIGS. 1 and 2, similar to FIGS. 3 and 4, but showing the manifold in a third, battery case filling position.
Figure 6:
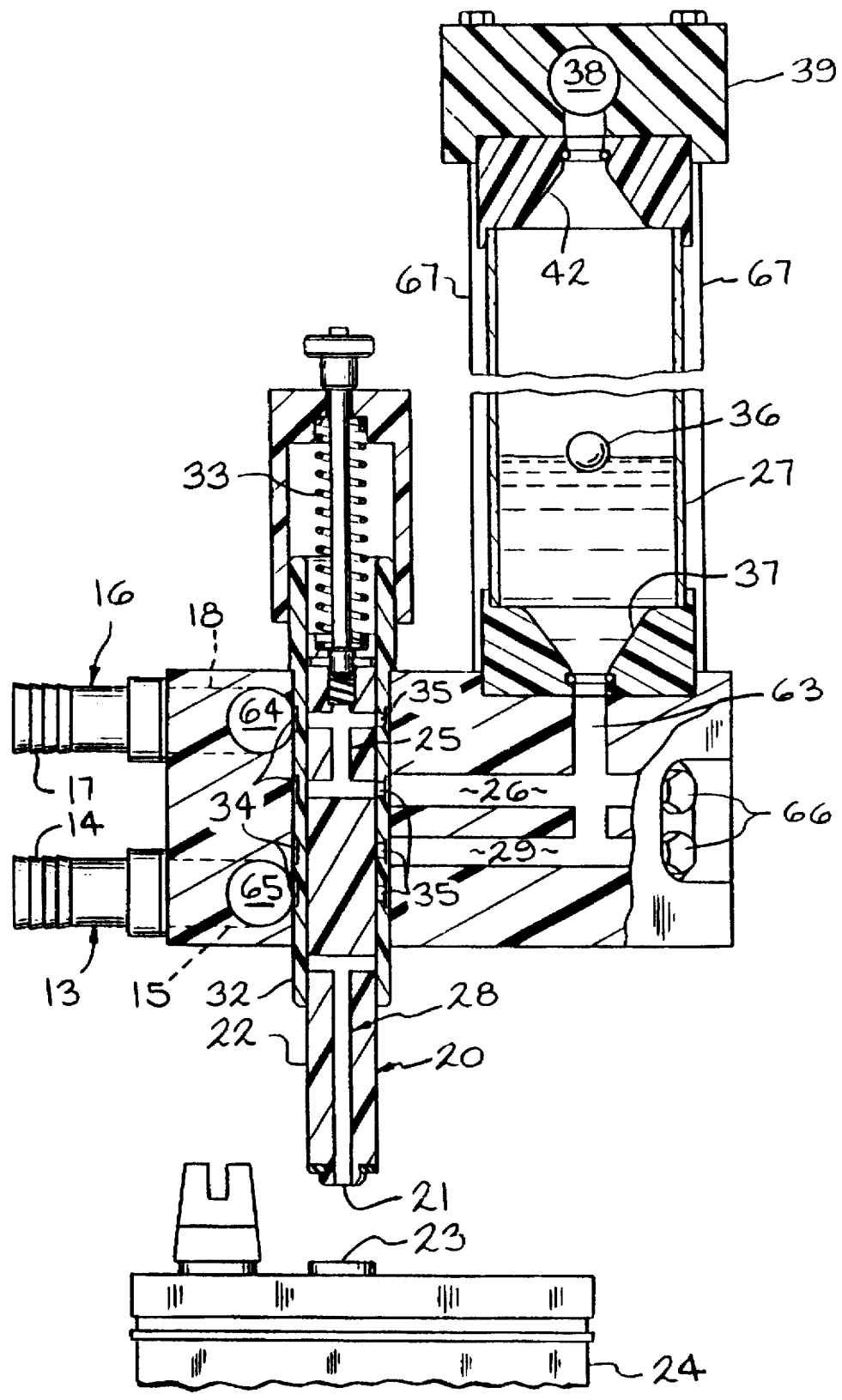
FIG. 6 is a left side elevational view of the apparatus of FIGS. 1 and 2, with the manifold in the first, electrolyte reservoir filling position.

Referring to the drawings and, in particular, to FIGS. 1 and 2, apparatus according to the invention for charging electrolyte to a battery is indicated generally at 10. The apparatus 10 comprises an electrolyte charging station 11, a manifold head 12 having a vacuum outlet 13 (see FIGS. 3–6) comprising an outlet fitting 14 and a vacuum passageway 15 connected to the fitting 14, an electrolyte inlet 16 comprising an inlet fitting 17 and an electrolyte passageway 18 connected to the fitting 17, a manifold positioner 19 (see FIGS. 1 and 2) operable to move the manifold head 12 to and to support the head 12 in a first rest position as shown in FIGS. 3 and 6, in a second battery case evacuating position as shown in FIG. 4, and in a third battery case filling position as shown in FIG. 5. The apparatus also includes a valve 20 (see FIGS. 3–6) having a fluid discharge 21 which is surrounded by a valve body 22 and is in fluid communication with the filling opening 23 (FIG. 3) of a battery 24 in the charging station when the manifold head 12 is in the second position (FIG. 4) and when the manifold head 12 is in the third position (FIG. 4), and is spaced from the battery 24 in the charging station 11 when the manifold head is in the first position (FIGS. 3 and 6). An end of the valve body 22 around the fluid discharge 21 is operable to engage the case of a battery 24 which is in the charging station 11, when the manifold head is in the second position and when the manifold head is in the third position, and is spaced from the battery 24 when the manifold head is in the first position. When the end of the valve body 22 engages a battery 24 in the charging station 11, it is in sealing relationship therewith.

When the manifold 12 is in the first position, as shown in FIG. 3, one leg of an "H" shaped passage 25 in the valve body 22 is aligned with the electrolyte passage 18 of the inlet 16 and another leg is aligned with an electrolyte passage 26 which is connected to an electrolyte reservoir 27.

The fluid discharge 21 of the valve 20 is a part of a T shaped passage 28 in the valve body 22. As is shown in FIG. 4, when the manifold 12 is in the second position, the cross of the passage 28 is aligned with the vacuum passageway 15 of the vacuum outlet 13 and the fluid outlet 21 is positioned to discharge into the interior of the battery 24, while an end of one leg of the opening 25 is aligned with the electrolyte passage 18 of the inlet 16 but the other three ends of the opening 25 are blocked. As is shown in FIG. 5, when the manifold 12 is in the third position, all four ends of the passage 25 are blocked, but one end of the cross of the T passage 28 is aligned with an electrolyte passage 29, which is in fluid communication with the reservoir 27, and the fluid discharge 21 is positioned in fluid communication with the filling opening of a battery 24 in the electrolyte charging station 11.

Referring, again, to FIGS. 1 and 2, when the apparatus 10 is in operation, with the manifold 12 in the first position, a conveyor 30 is energized to convey batteries 24 to be filled with electrolyte from left to right in FIG. 1 until a battery makes contact with a stop 31, de-energizing the conveyor 30; when tile conveyor stops, the battery that made contact with the stop 31 is in the electrolyte filling station 11. When the electrolyte reservoir 27 is full of electrolyte (as shown in FIG. 3) and a battery to be filled is in the filling station, the manifold 12 is lowered to the second position shown in FIG. 4, in which the end of the valve body 22 bears against and is in sealing relationship with the battery around the filling opening 23, and the valve body 22 is forced upwardly inside a sleeve 32 against the force of a spring 33. There are a plurality of annular grooves 34 in the exterior of the sleeve 32, and openings 35 through which fluid can flow between the T shaped opening 28 and each of the grooves 34. When the manifold 12 is in the second position, the top of the T shaped opening 28 is aligned with one of the annular grooves 34 so that flow can occur through that groove 34 and the associated one of the openings 35 between the vacuum passageway 15 of the vacuum outlet 13 and the T shaped passage. As a consequence, air is withdrawn from the battery, flowing through the battery filling opening 23, the fluid discharge 21 of the valve 20, the T shaped passage 28, the opening 35, the annular groove 34 and the vacuum outlet 13. After sufficient time, say 10 seconds, for the removal of air from the battery case, the manifold 12 is lowered to the third position shown in FIG. 5, and the valve body 22 is again forced upwardly inside the sleeve 32 against the force of the spring 33 so that the top of the T shaped opening 28 is aligned with one of the annular grooves 34, and electrolyte is withdrawn from the reservoir 27 and is charged to the battery 24 in the charging station 11. A ball 36 inside the reservoir 27 is received in a seat 37 when the last of the electrolyte flows from the reservoir 27, but there are ridges (not shown) in the seat 37 so that the ball 36 does not prevent the last of the electrolyte from flowing from the reservoir 27, through the electrolyte passage 29, and the T shaped passage 28 and into the battery 24 being filled.

After electrolyte has been charged to a battery as just described, the manifold is raised to the first position (FIGS. 3 and 6); the stop 31 (FIGS. 1 and 2) is withdrawn; and the conveyor 30 is energized again to bring another battery into the charging station 11. Vacuum is then applied to a passage 38 in an upper manifold 39, and electrolyte is introduced into the inlet 16, flowing through the fitting 17, the passageway 18, an aligned one of the annular grooves 34 in the sleeve 32, the H shaped passage 25, another annular groove 34 and the passage 26 into the reservoir 27 until the ball 36 is received in a seat 42, preventing the flow of additional electrolyte into the reservoir 27. The apparatus is then in the state shown in FIG. 3, and operation proceeds as previously described.

Referring again to FIGS. 1 and 2, the manifold positioner 19 comprises a ram (not illustrated) which is inside a hydraulic cylinder 43, and drives a rod 44 which is operably connected to the upper manifold 39. The upper and lower manifolds 39 and 12 are carried by a frame having side members 45 to which angle members 46 are attached. The angle members 46 are attached to rods 47 which are slidingly received in guides 48, so that the manifolds are vertically movable together to the positions previously described.

The apparatus 10 also includes vacuum tanks 49 and 50, an electrolyte tank 51 and motor-pump assemblies 52 and 53 which circulate electrolyte in two streams. Referring to FIG. 7, the motor-pump assemblies 52 and 53 withdraw two streams of electrolyte from the tank 51. One stream flows from the tank 51, through a venturi 54 and back to the tank 51, while the second flows from the tank 51, through a venturi 55 and back to the tank 51. The venturi 54 causes air to flow through a line 56 from the vacuum tank 49, while the venturi 55 causes air to flow through a line 57 from the vacuum tank 50. As a consequence, a vacuum is maintained in the tanks 49 and 50. Vacuum from the tank 49 is applied, as required, to the passage 38 from a line 58, while vacuum from the tank 50 is applied, as required, to the vacuum outlet 13 of the manifold 12 from a line 59. Electrolyte is supplied, as required, through a line 60 to the electrolyte inlet 16. Check valves 61 and 62 prevent the flow of air into the vacuum tanks 49 and 50 in the event of an interruption of the operation of the venturi 54 or of the venturi 55. Electrolyte from storage is introduced into the tank 51 as required to maintain the electrolyte level therein within acceptable limits.

FIGS. 3–6 show the upper and lower manifolds 39 and 12 of the apparatus 10, a reservoir 27 extending between the two, and a valve 20, which is composed of a valve body 22 and a sleeve 32 inside which the valve body 22 is slidably carried. The sleeve 32 and the valve body 22 are mounted on the lower manifold 12. As can be seen in FIG. 1, the apparatus 10 serves batteries 24 which have six cells. To accommodate such batteries, there are six valves 20 in the apparatus 10, and six reservoirs 27, one serving each valve 20. The reservoir 27 and the valve 20 shown in FIGS. 3–6 are those adjacent the left end of the apparatus 10 as seen in FIG. 1. The other reservoirs and valves are aligned behind those shown in FIGS. 3–6; their operation is identical. The manifold 12 was milled from a casting which was bored to provide the vacuum passageway 15, the electrolyte passageway 18, the electrolyte passages 26 and 29, an electrolyte passage 63, an electrolyte passageway 64 and a vacuum passageway 65. The electrolyte passages 26 and 29 were bored from the right hand side of the manifold 12, as seen in FIGS. 3–6, and the right ends thereof were then fitted with plugs (not shown) which are held in position by bolts 66. The electrolyte passageway 64 and the vacuum passageway 65 extend longitudinally of the manifold 12 to serve the other five valves 20 (not illustrated in FIGS. 3–6, but partially shown in FIG. 1) in the manner previously described, and there are electrolyte passages to serve the other five reservoirs 27 in the manner described.

While a spring 33 is shown to urge the valve body 22 downwardly, it has been found to be preferable to use an air piston for this purpose in order to minimize the risk of corrosion of the metal spring by the electrolyte.

Bolts 67 are shown in FIGS. 3–6 holding the electrolyte reservoirs 27 between the upper and lower manifolds 39 and 12. It will be appreciated that the bolts 67 can be removed and that, when it becomes necessary to change the size of the electrolyte reservoirs 27 or the spacing of the valves 20, or both, to accommodate a change to a battery which requires a different electrolyte charge or has different charging openings, to disconnect the upper and lower manifolds 39 and 12 from the reservoirs 27, to substitute appropriately sized electrolyte reservoirs, and then to reconnect the new reservoirs to the manifolds 39 and 12. It will also be appreciated that quick disconnect fittings could be used to attach the reservoirs 27 to the upper and lower manifolds, and their it would then be necessary only to release the quick disconnect fittings to make the change.

The apparatus of the instant invention can be modified slightly to accommodate batteries which use a gelled electrolyte, usually composed of sulfuric acid and a silica gel. The gelled electrolyte can be produced by mixing a slurry of finely divided silica with sulfuric acid. This can be done by adding a silica slurry reservoir, an associated inlet, an additional "H" shaped slot, and silica slurry passages for each electrolyte reservoir. An appropriate charge of the silica slurry is then introduced into each of the silica slurry reservoirs and discharged therefrom in the same way as the electrolyte. In this case, the electrolyte and the silica slurry should be combined and passed through a static mixer, and the effluent from the static mixer should be charged to the battery. An adequate static mixer can comprise a length of pipe or tubing with a plurality of longitudinally extending baffles therein. Each baffle can extend from wall to wall of the tube or pipe, and through a diameter thereof, and successive baffles can be rotated 90° relative to one another. The static mixer should be sized so that adequate mixing is achieved. The electrolyte, then, gels shortly after being introduced into the battery.

While a specific embodiment of the instant invention is shown in the attached drawings and has been described with reference thereto, it will be appreciated that various changes and modifications can be made without departing from the spirit and scope of the invention as defined in the attached claims.

We claim:

1. Apparatus operable to charge a controlled volume of an electrolyte through a filling opening into a battery case, said apparatus comprising an electrolyte charging station, a manifold head having a vacuum outlet and a vacuum passageway connected to said vacuum outlet, an electrolyte reservoir and an electrolyte passageway connected to said reservoir, a manifold head positioner operable to move said manifold head to and to support said head in a first electrolyte reservoir evacuating position, in a second battery case evacuating position, and in a third battery case filling position, and a valve having a fluid discharge which is surrounded by a tube and is in fluid communication with the filling opening of a battery in said charging station when said manifold head is in the second position and when said manifold head is in the third position, and is spaced from the battery in said charging station when said manifold head is in the first position, said tube being operable to engage the case of a battery in said charging station, around the filling opening therein, and in sealing engagement therewith, when said manifold head is in the second and third positions, said valve being operable:

when said manifold head is in the first position, to prevent the flow of fluid from said vacuum outlet and from said electrolyte reservoir to the fluid discharge of said valve, when said manifold head is in the second position, to enable the flow of fluid between said vacuum outlet, through said vacuum passageway and the fluid discharge of said valve and to prevent the flow of fluid between said electrolyte reservoir and the fluid discharge of said valve, and when said manifold head is in the third position, to prevent the flow of fluid between said vacuum outlet and the fluid discharge of said valve and to enable the flow of fluid between said electrolyte reservoir, through said electrolyte passageway and the fluid discharge of said valve.

2. Apparatus as claimed in claim 1 wherein said valve is also operable, when said manifold head is in the first position, to enable the flow of fluid through said vacuum passageway between said electrolyte reservoir and the fluid discharge of said valve.

3. Apparatus as claimed in claim 2 wherein said valve is also operable, when said manifold head is in the first position, to enable the flow of electrolyte from said electrolyte inlet to said electrolyte reservoir.

4. Apparatus as claimed in claim 3 which additionally includes a second vacuum outlet which is operable to withdraw fluid from said electrolyte reservoir, and a ball valve that is operable to prevent the flow of fluid through said second vacuum outlet when said electrolyte reservoir contains a given volume of electrolyte.

5. Apparatus as claimed in claim 1 which additionally includes a vacuum accumulator operably connected to said vacuum outlet of said manifold so that vacuum in said accumulator tends to cause the withdrawal of fluid from said vacuum outlet, an electrolyte tank, a venturi, and a pump for pumping electrolyte from said tank, through said venturi, and back to said tank, said venturi being operably connected so that the flow of electrolyte therethrough evacuates said vacuum accumulator.

6. Apparatus as claimed in claim 4 which additionally includes a vacuum accumulator operably connected to said second vacuum outlet so that vacuum in said accumulator tends to cause the withdrawal of fluid from said second vacuum outlet, an electrolyte tank, a venturi, and a pump for pumping electrolyte from said tank, through said venturi, and back to said tank, said venturi being operably connected so that the flow of electrolyte therethrough evacuates said vacuum accumulator.

7. Apparatus as claimed in claim 6 which additionally includes a second vacuum accumulator operably connected to said vacuum outlet of said manifold so that vacuum in said second accumulator tends to cause the withdrawal of fluid from said vacuum outlet, a second venturi, and a second pump for pumping electrolyte from said electrolyte tank, through said second venturi, and back to said electrolyte tank, said second venturi being operably connected so that the flow of electrolyte therethrough evacuates said second vacuum accumulator.

\* \* \* \* \*

UNITED STATES PATENT AND TRADEMARK OFFICE
CERTIFICATE OF CORRECTION

PATENT NO.  : 5,731,099
DATED       : March 24, 1998
INVENTOR(S) : Badger, et. al.

It is certified that error appears in the above-identified patent and that said Letters Patent is hereby corrected as shown below:

Column 4, Line 39 should read:
30; when the conveyor stops, the battery that made contact Column 6, Line 30 should read:
and that it would then be necessary only to release the quick Signed and Sealed this Twentieth Day of October, 1998

Attest:

BRUCE LEHMAN

Attesting Officer

Commissioner of Patents and Trademarks